United States Patent [19]
Fisher

[11] Patent Number: 6,150,632
[45] Date of Patent: Nov. 21, 2000

[54] ELECTRONIC LOCK-ON WIRE FEED SWITCH DEVICE

[75] Inventor: Howard J. Fisher, Canton, Mich.

[73] Assignee: Tregaskiss, Ltd., Oldcastle, Canada

[21] Appl. No.: 09/329,517

[22] Filed: Jun. 10, 1999

[51] Int. Cl.[7] .................................................... B23K 9/12
[52] U.S. Cl. ......................................................... 219/137.71
[58] Field of Search .............................. 219/137.71, 132, 219/137.7

[56] References Cited

U.S. PATENT DOCUMENTS

| | | | |
|---|---|---|---|
| 2,843,727 | 7/1958 | Benz, Jr. et al. | 219/137.7 |
| 4,531,045 | 7/1985 | Kemp | 219/132 |
| 4,608,482 | 8/1986 | Cox et al. | 219/137.71 |

*Primary Examiner*—Clifford C. Shaw
*Attorney, Agent, or Firm*—Fildes & Outland, P.C.

[57] ABSTRACT

An electronic lock-on switch device for controlling the supply of electrode wire from a wire feeder to a welding torch. The device includes a housing that encloses a trigger circuit. The trigger circuit is connectable between the wire feeder and the welding torch for receiving a trigger signal from the torch indicating the trigger has been pressed and transmitting a feed signal to the wire feeder indicating the need to feed wire through the torch. The trigger circuit includes a switch mounted on the outside of the housing to allow the operator to select between normal and lock-on modes of operation. During the normal mode of operation, the wire feeder is activated and deactivated by simply pressing and releasing the trigger of the welding torch. The lock-on mode of operation allows the operator to switch between normal and lock-on modes of operation by simply varying the time in which the trigger is pressed. If the operator continually presses the trigger for a predetermined time period, the trigger circuit will lock on the supply of wire through the torch regardless of whether the trigger is pressed, otherwise, the wire feeder will operate in the normal mode.

6 Claims, 2 Drawing Sheets

ELECTRONIC LOCK-ON WIRE FEED SWITCH DEVICE

FIELD OF THE INVENTION

This invention relates to the control of the supply of electrode wire through a welding torch and, more particularly, to an electronic lock-on switch device that is connectable between a wire feeder and a welding torch to control the supply of wire through the torch.

BACKGROUND OF THE INVENTION

It is known in the art relating to welding systems to provide a wire feed system that can operate between a normal mode and a lock-on trigger mode of operation. Usually, a mechanical switch is provided to change between the two modes of operation. During the normal mode of operation, the electrode wire is feed through the welding torch only when the welding torch trigger is continually pressed. During the lock-on mode of operation, a lock-on means is activated when the trigger is pressed and the wire supply is continually supplied regardless of whether the trigger is pressed. To make a transition between the two modes, the switch must be manually switched. Thus, the operator must interrupt the welding process and manually change the mode of operation. It is desirable to provide a device that allows the weld operator to easily switch between normal and lock-on modes of operation.

An electrical/electronic lock-on device may be used to switch between the normal and lock-on modes of operation. The electronic devices are incorporated into the wire feeder and can only be used with that specific wire feeder. Thus, it is also desirable to provide a device that can be used with any wire feeder and can be easily removed and installed on any wire feeder.

SUMMARY OF THE INVENTION

The present invention provides a lock-on switch device that is connectable between a wire feeder and a welding torch to control the supply of electrode wire through the welding torch. The device provides a lock-on feature that can be activated and deactivated at the trigger of the welding torch rather than having to manually activate or deactivate the lock-on feature. The device allows the operator to switch between normal and lock-on modes of operation by simply varying the amount of time the trigger is continually pressed.

The device includes a housing mountable on the wire feeder. The housing encloses a trigger circuit that is coupled between the welding torch and the wire feeder to receive a trigger signal from the welding torch when the trigger is pressed and, in response to the trigger signal to transmit a feed signal to the wire feeder to feed the electrode wire through the torch. The trigger circuit includes a switch located on the outside of the housing to allow the operator to select between normal and lock-on modes of operation of the wire feeder.

During the normal mode of operation of the welding torch, the operator presses the trigger of the welding torch to activate the supply of electrode wire through the torch and releases the trigger to deactivate the wire supply. When the trigger is pressed the trigger signal is sent to the trigger circuit via an electrical lead between the torch and the device. In response to that signal, the trigger circuit transmits the feed signal to the wire feeder via an electrical lead.

During the lock-on mode of operation of the welding torch, the operator presses the trigger of the welding torch to activate the supply of the electrode wire and if the trigger is released before a predetermined time period the wire feed is deactivated. However, if the operator continually presses the trigger for more than a predetermined time period, the wire supply is locked on and regardless of whether the operator is pressing the trigger, the wire is feed through the torch. To release the lock-on mode, the trigger is simply pressed again. When the trigger is pressed the trigger signal is sent to the trigger circuit and the trigger circuit transmits the feed signal to the wire feeder but also counts the period in which the trigger is pressed. If the trigger is pressed for the predetermined time period, the trigger circuit will lock on the wire feeder by continuously transmitting the feed signal to the feeder regardless of whether the trigger is pressed.

By providing a lock-on feature that is activated at the trigger, the operator can easily switch between the lock-on mode and the normal mode. The device provides an easy transition between short and long welds. Further, the device provides a lock-on feature that can be attached to an established welding system. The lock-on device may be adaptable to most manufacturers' wire feed systems.

These and other features and advantages of the invention will be more fully understood from the following detailed description of the invention taken together with the accompanying drawings.

DETAILED DESCRIPTION OF THE INVENTION

Figure 1:
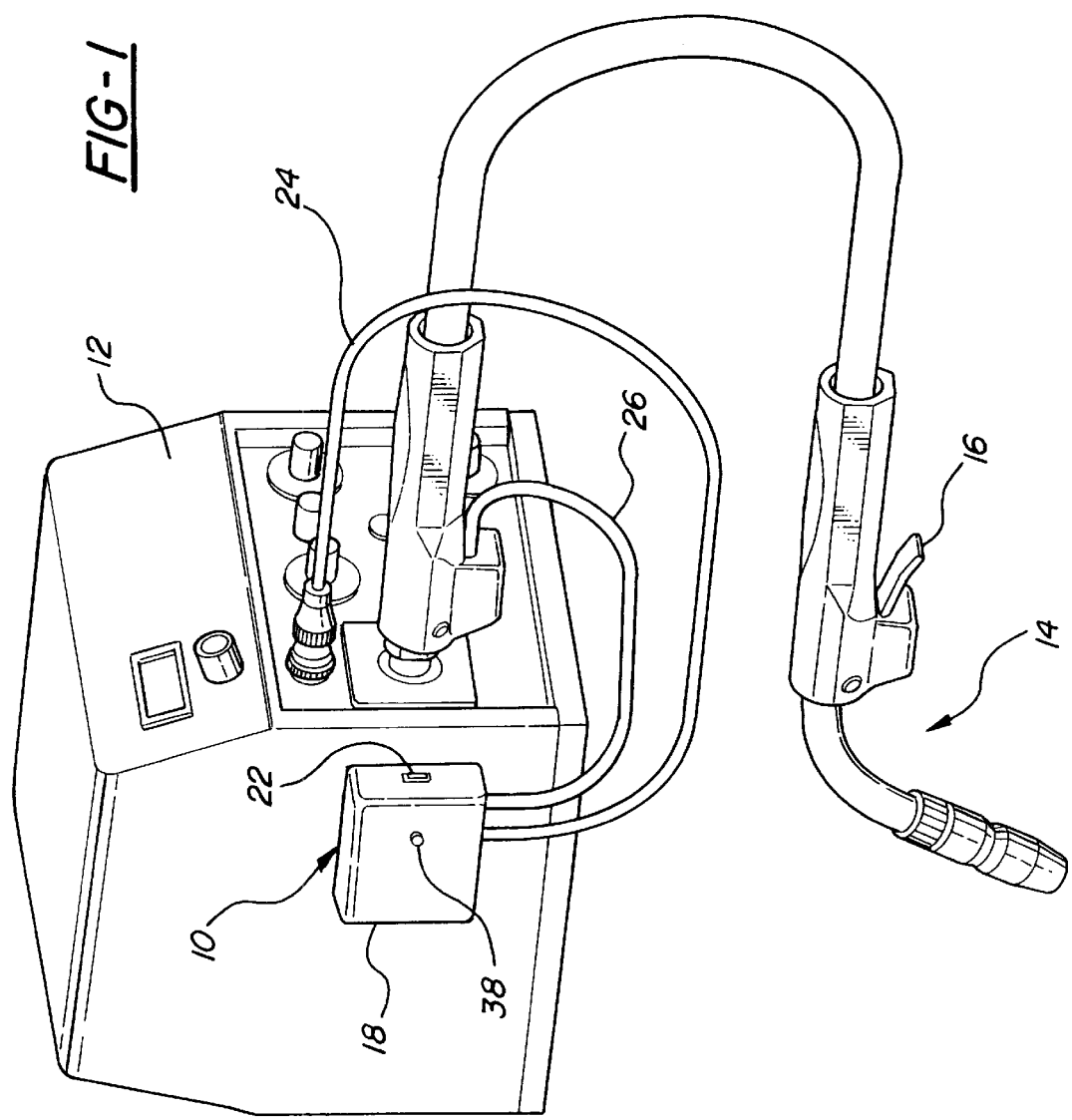
FIG. 1 is a perspective view of an electronic lock-on switch device mounted on a wire feeder and connected between the wire feeder and a welding torch in accordance with the present invention.
Figure 2:
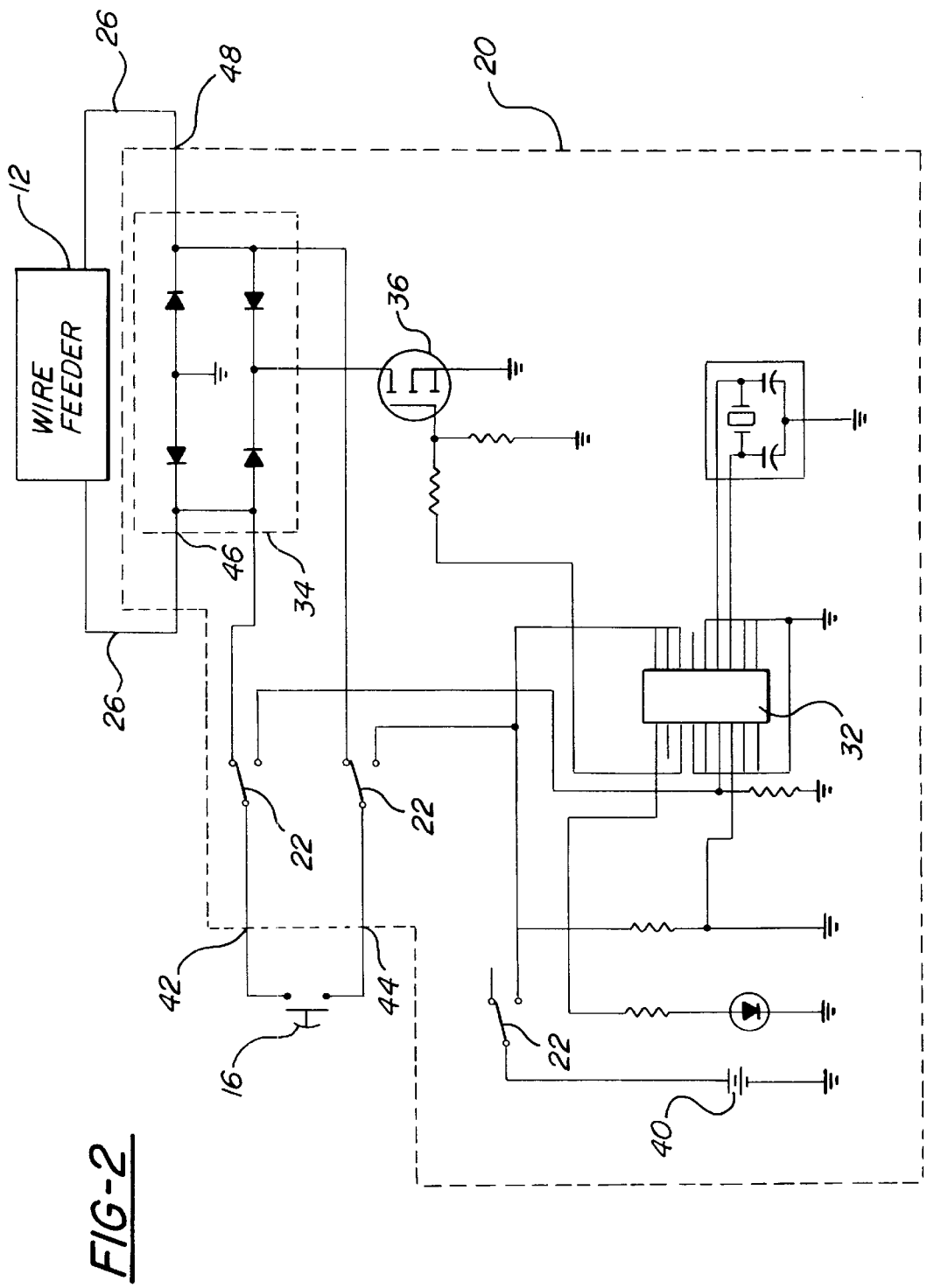
FIG. 2 is a schematic circuit diagram of a welding system in accordance with the present invention.

Referring to FIGS. 1 and 2 of the drawings in detail, numeral 10 generally indicates an electronic lock-on switch device for controlling the supply of electrode wire from a wire feeder 12 through a welding torch 14. The device 10 allows the operator to operate the wire feeder 12 between two different modes of operation, normal and lock-on modes, by simply varying the amount of the time in which a trigger 16 of the welding torch 14 is pressed.

The lock-on switch device 10 includes a housing 18 that encloses a trigger circuit 20. The housing 18 is mountable to the wire feeder 12 by any various types of fastening means such as screws, magnetic or velcro fasteners. The trigger circuit 20 includes an electrical switch 22 which is mounted on the outside of the housing 18. The mode of operation is selected by moving the switch 22 between normal and lock-on positions. The trigger circuit 20 is also coupled between the wire feeder 12 and welding torch 14 via electrical leads 24, 26 which extend from the housing 18.

When the normal mode of operation is selected, the operator presses the trigger 16 to activate the supply of electrode wire through the torch 14 and releases the trigger 16 to stop the wire supply. When the trigger 16 is pressed, a trigger signal is received by the trigger circuit 20 and in response the trigger circuit 20 transmits a feed signal to the wire feeder 12 indicating the need to feed wire through the welding torch 14.

When the lock-on mode of operation is selected, the wire feeder 12 may be controlled between a normal and lock-on modes of operation by simply varying the time in which the trigger 16 is pressed. If the operator does not continually press the trigger 16 for a predetermined time period such as five seconds, the wire feeder 12 will operate in the normal mode. The wire is supplied when the trigger 16 is pressed and stopped when the trigger 16 is released. The trigger signal is received by the trigger circuit 20 and in response the circuit 20 transmits the feed signal to the wire feeder 12. However, if the operator continually presses the trigger 16 for the predetermined time period, the trigger circuit 20 locks on the supply of wire by latching on the feed signal to the feeder 12 regardless of whether the trigger 16 is pressed. The lock-on mode may be deactivated by pressing the trigger 16 again. The trigger circuit 20 receives the trigger signal and terminates the transmission of the feed signal to the wire feeder 12.

Referring to FIG. 2, in one embodiment of the present invention, the trigger circuit 20 essentially includes switch 22, controller 32, bridge rectifier 34, transistor 36, LED 38, and battery 40. The trigger 16 of the welding torch 14 is connected between terminals 42 and 44. The wire feeder 12 is connected between terminals 46 and 48. Terminal 46 is connected to the positive side of the dc line voltage from the feeder 12 and terminal 48 is connected to the negative side of the dc line voltage from the feeder 12.

The normal mode is selected by moving the switch 22 into position A. When the trigger 16 is pressed, the trigger circuit 20 is closed. During the positive half cycle of the dc line voltage, current flows from terminal 46 to terminal 42 and/or to ground through diode D3, then through the trigger 16 to terminal 44, back to terminal 48 and current returns through diode D2 and back to terminal 48. During the negative half cycle, current flows from terminal 48 through diode D4 and/or to terminal 44, through the trigger 16 to terminal 42 and then to terminal 46 and/or current returns through diode D1 and then to terminal 46. The feed signal is transmitted to the wire feeder 12 by bypassing the controller 32 and passing through just the bridge rectifier 34.

When the lock-on mode is selected switch 22 is in position B. When the trigger 16 is pressed the trigger circuit 20 is closed and 5 volts from the battery 40 is supplied to the controller at inputs VDD, TRIG and CLKIN. The battery may be a 9 volt dc Alkaline battery having a target life of one year. VDD is the power input of the controller 20, TRIG signals to the controller 32 that the trigger 16 has been pressed and CLKIN counts the time in which the trigger signal is received by the controller. As soon as, the controller 32 receives the trigger signal at input TRIG, the controller 32 produces a logic HIGH output at FEED. The output FEED is coupled to the transistor 36. Preferably, the transistor 36 is a metal-oxide semiconductor field-effect transistor (MOSFET). The output FEED is applied to the gate of the MOSFET which turns on the MOSFET allowing the feed signal to proceed through the bridge rectifier 34. Similarly as in the normal mode, the feed signal proceeds through half of the bridge rectifier 34 for the negative swing and the other half of the bridge rectifier 34 for the positive swing and back to the feeder 12.

Simultaneously, the controller 32 counts the time period in which the trigger signal is received at input CLKIN, if the trigger signal is received for a predetermined period such as five seconds, the controller 32 will produce a logic HIGH output at FEED, turning on the transistor 36. Thus, regardless of whether the trigger 16 is pressed, the feed signal will be sent to the feeder 12 to supply wire to the welding torch 14. To deactivate the lock-on mode the operator presses the trigger 16 again and then the controller 32 will receive the trigger signal at TRIG and will deactivate the lock-on feature by producing a logic LOW output at FEED.

The controller 32 also alerts the operator when the battery 40 is need of replacement. The controller 32 turns on the LED 38 which is connected to output BAT of the controller 32 when the battery 40 is need of replacement. For example, the LED 38 may be activated when the voltage of battery 40 drops below 8 volts dc under load. The housing 18 may be provided with a removable panel to allow access to the battery 40 for replacement. To conserve energy and extend the life of the battery, the controller 32 may go into a sleep mode when the lock-on mode has been activated for more than ten seconds. The sleep mode draws a minimum of battery energy and is preprogrammed in various types of microcontrollers. By providing a lock-on feature that is activated at the trigger 12, the operator can easily switch between the lock-on mode and the normal mode and thus providing an easy transition between short and long welds.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A switch lock-on device for use in combination with a wire feeder for controlling the supply of electrode wire from the wire feeder to a welding torch, the switch lock-on device comprising:

a housing mountable to the wire feeder; and a trigger circuit including a controller disposed in the housing and coupled to the welding torch and the wire feeder for receiving a trigger signal from the welding torch indicating that a trigger of the torch has been pressed;

said controller counting the time in which the trigger signal is received by the controller and, in response to the time the trigger signal is received alone, transmitting a feed signal to the wire feeder to activate the supply of wire through the torch, said trigger circuit includes a switch mounted on the outside of the housing to allow a welder to select between a normal mode of operation and a lock-on mode of operation of the welding torch, when the normal mode is selected, the trigger circuit produces the feed signal in response to receiving the trigger signal, and when the lock-on mode is selected, the trigger circuit produces a feed signal in response to receiving the trigger signal and counts the period in which the trigger signal is received, when the trigger signal is received for a predetermined time period, the trigger circuit locks on the wire feeder by transmitting the feed signal to the wire feeder regardless of whether the trigger of the welding torch is pressed.

2. A device as in claim 1 wherein the trigger circuit includes a controller which during the lock-on mode of operation receives the trigger signal, produces the feed signal in response to the trigger signal, counts the time period in which the trigger signal is received by the controller and locks on the wire feeder when the trigger signal has been received for the predetermined time period.

3. A device as in claim 2 wherein during the normal mode of operation, the controller is bypassed.

4. A device as in claim 2 wherein the trigger circuit includes a battery to supply power to the controller during the lock-on mode of operation.

5. A device as in claim 1 wherein the trigger circuit is connected to the welding torch and wire feeder through electrical leads extending from the housing.

6. A device as in claim 1 wherein the housing is mounted to the wire feeder by a mechanical fastener.

* * * * *